(12) United States Patent
Chen et al.

(10) Patent No.: US 7,844,251 B2
(45) Date of Patent: Nov. 30, 2010

(54) PEER-TO-PEER DISTRIBUTED BACKUP SYSTEM FOR MOBILE DEVICES

(75) Inventors: Liren Chen, San Diego, CA (US); Jack Steenstra, San Diego, CA (US); Kirk S. Taylor, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1133 days.

(21) Appl. No.: 11/249,983

(22) Filed: Oct. 12, 2005

(65) Prior Publication Data

US 2007/0207729 A1    Sep. 6, 2007

(51) Int. Cl.
*H04M 1/66* (2006.01)
*H04M 11/00* (2006.01)

(52) U.S. Cl. ............... 455/410; 455/41.2; 455/557; 455/412.1

(58) Field of Classification Search ............ 455/15, 455/3.03, 3.04, 3.01, 3.05, 412.1, 41.1–2, 455/502, 517, 550.1, 557, 41.2, 411, 410; 709/238, 245, 219
See application file for complete search history.

(56) References Cited

U.S. PATENT DOCUMENTS

| | | | | |
|---|---|---|---|---|
| 5,968,121 | A * | 10/1999 | Logan et al. | 709/219 |
| 6,477,543 | B1 * | 11/2002 | Huang et al. | 707/200 |
| 7,328,366 | B2 * | 2/2008 | Michelman | 714/6 |
| 2003/0009586 | A1 * | 1/2003 | Harrow et al. | 709/238 |
| 2003/0030680 | A1 * | 2/2003 | Cofta et al. | 345/864 |
| 2005/0050227 | A1 * | 3/2005 | Michelman | 709/245 |

FOREIGN PATENT DOCUMENTS

| | | |
|---|---|---|
| EP | 1 014 266 A2 | 6/2000 |
| WO | WO 97/04389 A1 | 2/1997 |
| WO | WO 03/005640 A2 | 1/2003 |
| WO | WO 2004/044756 A1 | 5/2004 |
| WO | WO 2004/084082 A1 | 9/2004 |

OTHER PUBLICATIONS

Office Action for EP Patent Application 06 816 705.5-224 dated Apr. 2, 2009, 13 pages.
International Search Report mailed Apr. 24, 2008, for PCT Application Serial No. PCT/US2006/039712, 9 pages.
European Office Action dated Jul. 21, 2008, for European Patent Application Serial No. 06816705.5, 2 pages.

* cited by examiner

*Primary Examiner*—John Lee
(74) *Attorney, Agent, or Firm*—Turocy & Watson, LLP

(57) ABSTRACT

Some embodiments provide a method, system, and apparatus for transparently backing-up information from a mobile device to distributed devices having storage capabilities. As the mobile device comes within communication range of one or more of the trusted partner devices, information from the mobile device is backed up, in segments or portions, on the one or more distributed partner devices. Information backed-up in one partner device may be transferred to another partner device for storage. A centralized master server may also maintain a list of the locations (e.g., partner devices) where backup information is maintained for the mobile device. When requested to do so by a user, the centralized server can retrieve and consolidate the backup information for the mobile device.

20 Claims, 6 Drawing Sheets

Master Backup Index

| Backup Fragment | Location | Date |
| --- | --- | --- |
| Pictures 1-8 | Partner Device A | 01/01/2004 |
| Phone Numbers | Partner Device D | 05/09/2004 |
| Text Messages 34-45 | Partner Device C | 08/07/2005 |
| Phone Numbers | Partner Device E | 03/06/2005 |
| Pictures 14-17 | Partner Device B | 11/26/2004 |

PEER-TO-PEER DISTRIBUTED BACKUP SYSTEM FOR MOBILE DEVICES

BACKGROUND

1. Field

The present invention generally relates to backup systems for mobile devices, and more specifically providing a distributed and transparent way of backing-up content from a mobile device to other devices.

2. Background

Mobile devices, such as cellular/mobile telephones, personal digital assistants (PDA), pagers, mobile computers, etc., are widely used for many types of applications that store information on the mobile devices. For example, mobile phones may store contact information (e.g., phone numbers, addresses, etc.), text messages, pictures, and other types of information. As a result of their expanding capabilities and features, users have become dependent on such mobile devices as part of their daily lives and/or business. Whether it be contact information, pictures, electronic files, electronic mail, or other types of information, the information stored in such mobile devices has become increasingly important to users. Thus, it has become increasingly important to backup such information to minimize losses and inconveniences in case the mobile device is lost, stolen, or malfunctions.

However, backing up information from mobile devices is not an easy task. Many mobile devices, such as mobile phones, do not provide a convenient way to backup the information stored therein. Additionally, those mobile devices that provide backup mechanism often require that the mobile device be physically coupled to a computer and that the user initiate the backup procedure. This is at minimum inconvenient and relies on the user to remember to backup the information.

Additionally, with expanded features and capabilities, mobile devices often include significant storage capacity of several megabytes to hundreds of gigabytes. Backing up such large amount of information would require a significant amount of time, thereby inconveniencing a user even more. Even if a user decides to backup information from a mobile device, a significant amount of storage space may be needed from the user's computer to store such information.

The different types of mobile devices and varying communication interfaces also makes it difficult to provide a convenient backup mechanism that can be implemented on various types of mobile devices. Certain types of wireless interfaces have limited capacity, ranging from tens of kilobits per second for a typical commercial cellular network to tens of megabit per second for a wireless LAN network. Coupled with the large storage space on many mobile devices and limited battery life, it becomes physically impossible for a user to back-up all the information stored on a mobile devices at once.

SUMMARY

Some embodiments provide a method, system, and apparatus for transparently backing-up information from a mobile device to distributed devices having storage capabilities. As the mobile device comes within communication range of one or more of the trusted partner devices, information from the mobile device is backed up, in segments or portions, on the one or more distributed partner devices. Information backed-up in one partner device may be transferred to another partner device for storage. A centralized master server may also maintain a list of the locations (e.g., partner devices) where backup information is maintained for the mobile device. When requested to do so by a user, the centralized server can retrieve and consolidate the backup information for the mobile device.

According to one implementation, a mobile device comprises a storage device to store mobile device content, and a processing unit configured to (a) locate a first partner device to receive the mobile device content, (b) determine whether the first partner device is trustworthy to receive the mobile device content, (b) determine the portions of the mobile device content that should be backed-up, (c) determine the amount of information the first partner device can backup, (d) obtain a portion of the mobile device content from the storage device, and (e) send the portion of the mobile device content to the first partner device for backup, and (f) restore the backup information from a plurality of partner devices to the storage device.

The mobile device may further include one or more communication interfaces coupled to the processing unit, wherein the processing unit is configured to search for the first partner device through the one or more communication interfaces. The one or more interfaces may provide a wireless communication link or a wired communication link to the first partner device. Additionally, the mobile device may be further configured to (a) locate a second partner device to receive the mobile device content, (b) obtain another portion of the mobile device content from the storage device, and (c) send the another portion of the mobile device content to the second partner device for backup.

Another implementation provides a partner device comprising a storage device to backup information from a mobile device, and a processing unit configured to (a) determine whether a mobile device is a trusted device, (b) determine the amount of information the storage device can receive from the mobile device for backup, (c) receive information to backup from the mobile device, (d) store the received information in the storage device, and (e) notify a centralized server of the portions of information from the mobile device that are backed-up in the storage device, (f) send the backup information to a centralized storage server, and (g) remove the received information from the storage device upon receipt of a message from a centralized server. The information may be wirelessly received from the mobile device and may be a portion of the information available for backing-up at the mobile device.

Some implementations provide a centralized server comprising a communication interface to obtain index information associated with backup information stored in one or more partner devices and a processing unit configured to (a) maintain an index of the one or more partner devices where backup information is stored, and (b) obtain the backup information from the one or more partner devices to reconstruct the information of a mobile device. Additionally, the centralized server may determine whether there are duplicate versions of the backup information on the one or more partner devices, and, if there are duplicate versions of the backup information, then inform the partner device with the oldest version of the backup information that it can be deleted.

Another feature of the invention provides a method for use in a mobile device backup system, comprising (a) identifying a plurality of partner devices for storing backup information for the mobile device, (b) locating a partner device to receive backup information, (c) determining the amount of information the partner device can backup, (d) determining whether the mobile device has information to backup, (e) sending a portion of the backup information to the partner device, (f) obtaining the backup information for the mobile device from the plurality of partner devices, (g) consolidating the obtained backup information from the plurality of partner devices, and (h) restoring the backup information from the plurality of partner devices to the mobile device.

Another feature of the invention provides a method for use in a distributed device backup system, comprising (a) determining whether a mobile device seeks to backup information in a partner device, (b) receiving backup information from the mobile device, and (c) storing the backup information in the partner device. Additionally, the method may include (a) retrieving backup information from the partner device, (b) transferring backup information from the partner device to another partner device, (c) removing the backup information from the partner device if a more recent version of the backed-up information is stored elsewhere, (d) and storing the backup information in a centralized server.

Another feature of the invention provides a method for use in a centralized server for indexing backup information, comprising (a) obtaining index information associated with distributed backups stored in one or more partner devices, (b) maintaining an index of backup information associated with a particular mobile device, (c) obtaining the backup information from the one or more partner devices to reconstruct the information of the particular mobile device, (d) determining whether there are duplicate versions of the backup information on the one or more partner devices; and (e) if there are duplicate versions of the backup information then informing the partner device with the oldest version of the backup information that it can be deleted.

DETAILED DESCRIPTION

Figure 1:
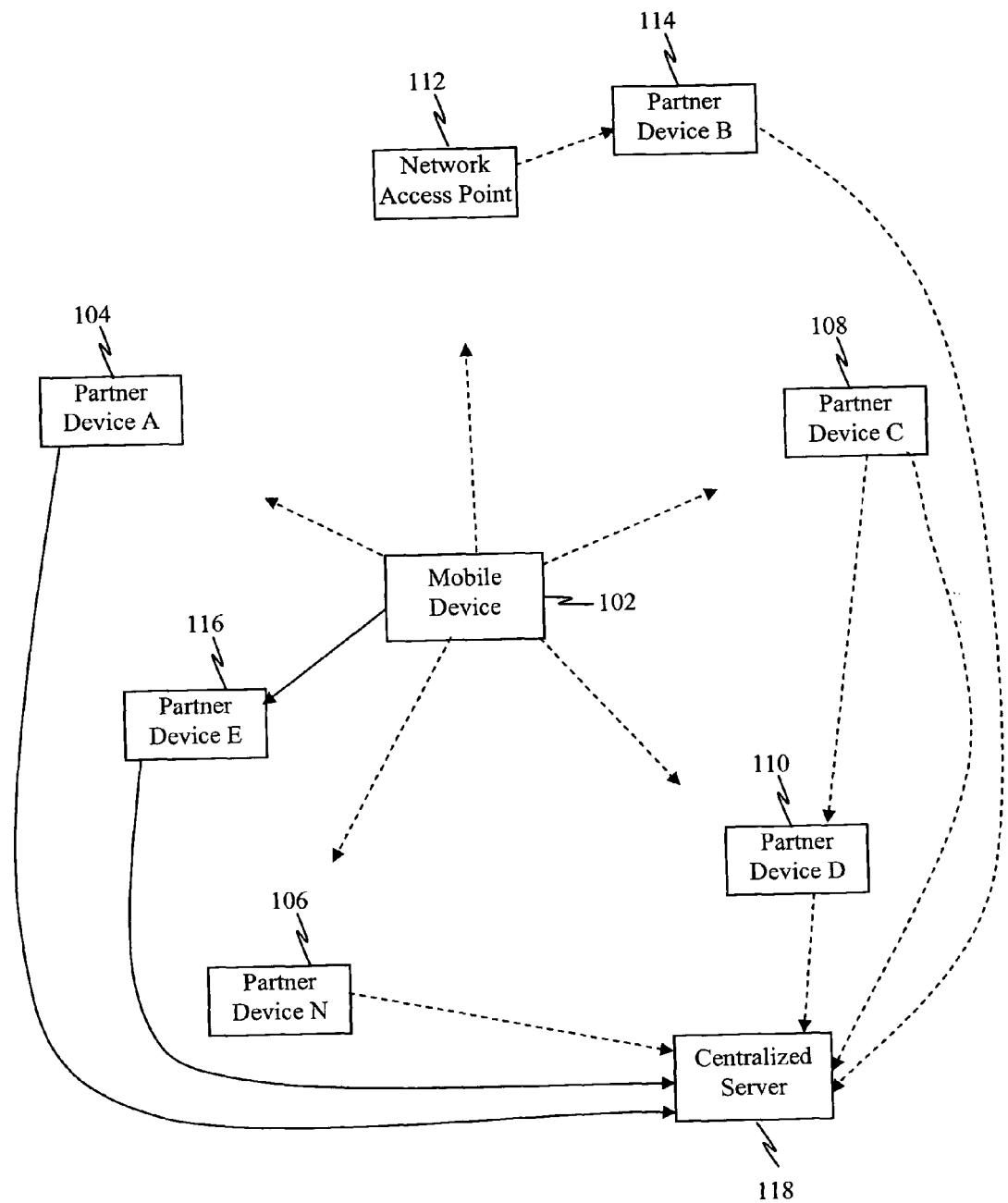
FIG. 1 is a block diagram illustrating one example of a peer to peer distributed backup system for mobile devices according to one implementation.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention. For instance, the term "mobile device" refers to handheld computers, laptop computers, personal digital assistants (PDA), wireless devices, mobile phones, pagers, wireless modems, music players (e.g., MP3 players), personal information managers, and/or other communication/computing devices. The term "partner device" is used to refer to an electronic device, computer, processing unit, storage device, and/or mobile device with which a trust relationship has been established. The terms "content" and "information" are interchangeably and broadly used to refer to all types of data including, telephone numbers, contact information, electronic mail, video, digital pictures, sound recordings, graphics, text messages and documents, etc., and file systems. The term "storage device" refers to a device that can store information, such as hard-drives, static memory, flash memory, solid state disk, etc.

Some embodiments provide a method, system, and apparatus for transparently backing-up information from a mobile device to trusted devices as the mobile device comes within communication range of one or more of the partner devices. Another feature provides that the information from the mobile device is backed up in segments or portions across a plurality of distributed partner devices. Information backed-up in one partner device may be transferred to another partner device for storage. By distributing backup information across multiple partner devices, the distributed backup system makes efficient use of surplus storage capacity on partner devices avoiding the transfer time and storage costs associated with storing all information on a single location. A centralized master server may maintain a list of the locations (e.g., trusted partner devices) where backup information is maintained for a mobile device. In another aspect, the centralized master server may obtain and store all backups from the various partner devices. Thus, the centralized server facilitates recovery and reconstruction of information.

FIG. 1 is a block diagram illustrating one example of a peer to peer distributed backup system for mobile devices according to one implementation. A mobile device 102 may move through various locations as it is carried by its user. The mobile device 102 may include an application or program that interacts with the operating system and is configured to backup user content, such as contact information, caller lists, phone numbers, call records, text messages, voice mail, images, music, files, etc., from the mobile device 102 to other trusted or partner devices 104, 106, 108, 110, 114, and/or 116. Because mobile devices, by their nature, move around with a user, having to physically connect a mobile device to host system (e.g., computer) to download or backup information is inconvenient. Additionally, with mobile devices having increasingly larger storage capacities (e.g., megabytes to hundreds of gigabytes), the amount of time to backup such large amount of information becomes prohibitive in many instances, and at minimum very inconvenient to the user. Thus, the present invention provides a distributed backup system that enables mobile device 102 to backup information piecemeal (e.g., in portions or fragments of the total information to backup) to other devices with which it comes into contact (e.g., wireless or wired communication).

As the mobile device 102 moves around with a user, it may come into contact with one or more trusted or partner devices partner devices 104, 106, 108, 110, 114, and/or 116. Partner devices are devices with which a mobile device has established, either beforehand or on-the-fly, a secure or trusted relationship. That is, the mobile device believes that the partner devices are secure enough or trustworthy enough to hold its backup information and, conversely, the partner devices are willing to provide backup storage for the mobile device. The level of "trust" between a mobile device and a partner device to establish a relationship may vary from minimal (e.g., a mere reply that the partner device is willing to accept backup information from the mobile device) to a pre-established secure relationship between the partner and mobile devices (e.g., involving predefined access permissions between the devices).

In some implementations, the mobile device may communicate wirelessly with a partner device 104, determine whether partner device 104 is able and willing to receive backup information from mobile device 102, and send backup information to the partner device 104. In some situations, a wired communication link (e.g., direct or indirect link or network) from partner device 104 may serve to inform a centralized server 118 that partner device 104 has backup information from mobile device 102. Similarly, mobile device 102 may backup information to a partner device 106 via a wireless communication which then communicates such occurrence to centralized server 118 via a wireless link. In yet another type of information backup, mobile device 102 may backup information to through a wired connection (e.g., interface cable or docking station) to partner device 116 which then informs centralized server 118 of such backup occurrence. Another type of partner device 108 may receive and store backup information from mobile device 102 and inform centralized server 118 of such occurrence via one of multiple communication paths. For example, partner device 108 may send such notification to centralized server 118 either directly, via a wired or wireless link, or indirectly, via another partner device 110 or a network device. In yet another configuration of the invention, mobile device 102 may communicate with a partner device 114 via a network access point 112.

In sending backup information to the various partner devices with which it communicates, mobile device 102 may send just portions of the information available for backup. This way, mobile device 102 is able to backup a large amount of information onto multiple partner devices 104, 106, 108, 110, 114, and/or 116 during the, typically, short periods of time that mobile device 102 comes into contact with each partner device. That is, since mobile device 102 moves around with its user, it may only have a short period of time in which to backup information to partner devices. Thus, fragmenting the information into smaller portions permits the mobile device to backup such information across one or more distributed partner devices.

Another feature provides for a partner device to offload its backed-up information from a mobile device on to another device. For example, partner device 108 may offload backed-up information from mobile device 102 on to partner device 110. In various implementations, the second device on to which a partner device offloads backup information need not be a partner device of mobile device 102. For instance, partner device 110 may have a trusted relationship with partner device 108 but not with mobile device 102.

In some implementations, mobile device 102 can define the level of security it seeks for its backed-up information from the partner devices to which it sends backup information. Such level of security may be passed on to partner devices so that they can store the backup information appropriately. Additionally, such security information may also indicate whether a partner device can offload backed-up information to other devices.

Figure 2:
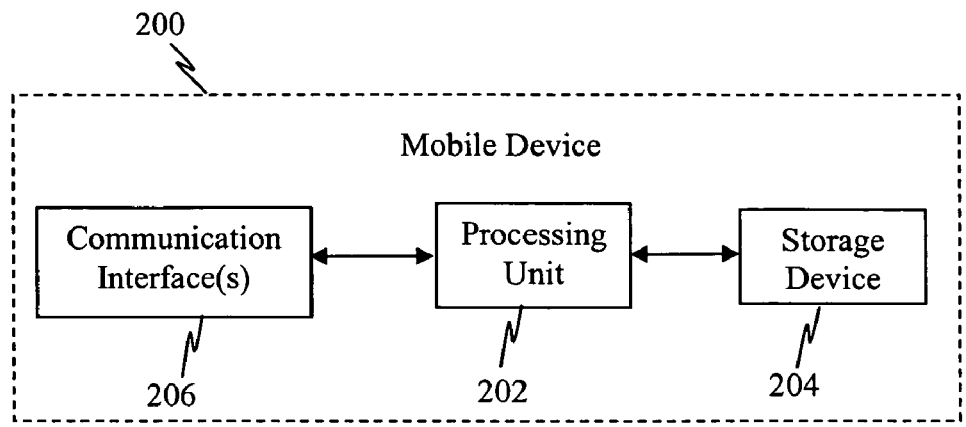
FIG. 2 is a block diagram illustrating a mobile device according to some implementations.

FIG. 2 is a block diagram illustrating a mobile device 200 according to some implementations. Mobile device 200 includes a processing unit 202 coupled to a storage device 204 and one or more communication interfaces 206. Processing unit 202 may execute a program or application that can be configured by a user to backup mobile device content, such as contact information, text messages, music, files, digital pictures, games, etc., from mobile device 200 to partner devices. A user may configure the order or priority in which the information or content should be backed-up. Such application may operate automatically, without user interaction, so that the mobile device backs-up its information in the "background" (e.g., without affecting mobile device operation). Thus, a user can operate the mobile device (e.g., use a cell phone or PDA) without being affected by the background backup application.

The backup application may first determine whether it has information that should be backed-up. This may be done by determining if new information is stored in the storage device 204. Alternatively, mobile device 200 backs-up information in the storage device periodically.

If information is to be backed-up, the background backup application may then determine which communication interface and/or protocol should be used. According to one aspect of the invention, mobile device 200 may consider a variety of factors, such as cost, availability, and/or bandwidth of the communication interface in making a selection. Thus, the mobile device is configured to recognize available wired and/ or wireless communication interfaces that it can use to communicate with partner devices on one or more different networks and/or protocols.

According to one implementation, mobile device 200 sends periodic search broadcasts to find potential backup partners through one or more communication interfaces. Once a backup partner is identified and it has agreed to receive backup information from mobile device, mobile device 200 sends a portion of its backup information to it. Such transmissions of backup information may occur through one or more of communication interfaces 206 available to mobile device 200. For instance, communication interfaces 206 may include an IEEE 802.11 wireless interface, a Bluetooth-compliant interface, a Universal Serial Bus (USB) interface, a cellular phone radio frequency interface, a pager radio frequency interface, etc. In some implementations, the background backup application may utilize a primary communication interface to locate and backup information to a partner device. For instance, where mobile device 200 is a cellular phone, the backup application may use the cellular (radio frequency) interface when not in use by the user, to backup information. In other implementations, the backup application may employ secondary communications interfaces (e.g., those not used for primary communications of the mobile device) to backup information to a partner device.

In some implementations, the communications and/or backed-up information may be encrypted by mobile device 200 so that it can be secured during transmission and prevent access by unauthorized parties.

Figure 3:
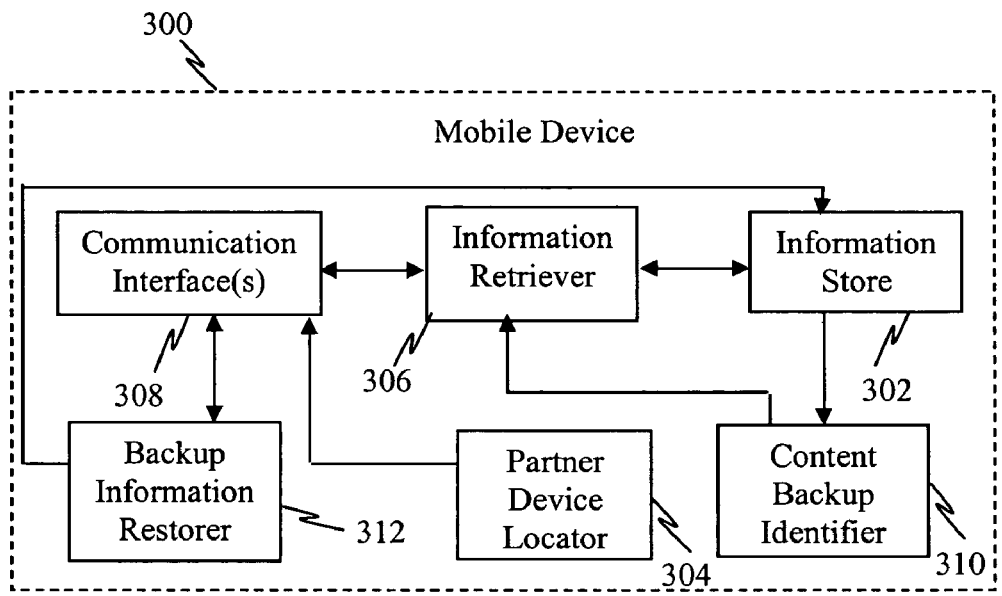
FIG. 3 is a block diagram illustrating components and functions of a mobile device according to some implementations.

FIG. 3 is a block diagram illustrating components and functions of a mobile device 300 according to some implementations. The mobile device 300 includes an information store 302, a partner device locator 304, an information retriever 306, and a communications interface 308. The information store 302 may contain content for the mobile device 300. The partner device locator 304 identifies one or more partner devices to backup the information from the mobile device 300. The information retriever 306 retrieves a portion of the information from the information store 302, as directed by the content backup identifier 310, and sends it to a partner device via communication interface 308. The content backup identifier 310 may determine what portions of the content in the information store 302 are to be backed-up. A backup information restorer 312 serves to restore backed-up information from a plurality of partner devices.

One or more of the components and functions illustrated in FIGS. 2 and/or 3 may be rearranged and/or combined into a single component or embodied in several components without departing from the invention. Additional elements or components may also be added without departing from the invention.

Figure 4:
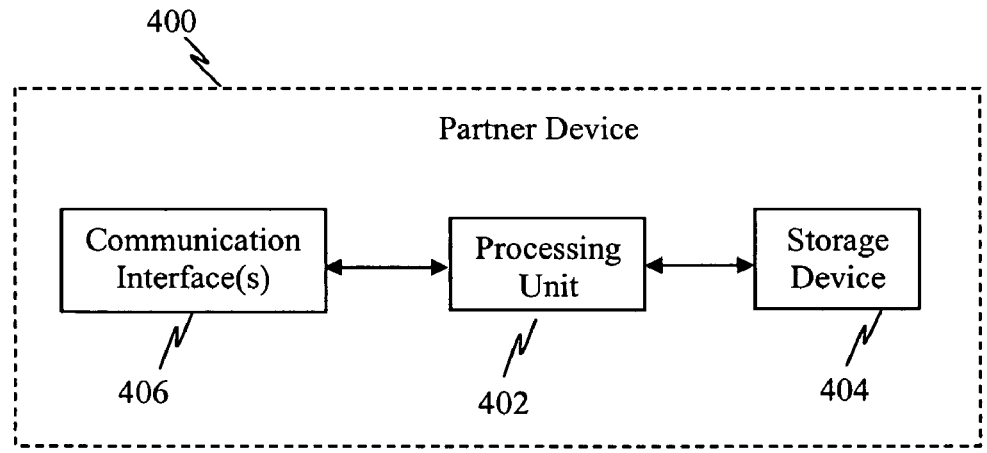
FIG. 4 is a block diagram illustrating a partner device according to some implementations.

FIG. 4 is a block diagram illustrating a partner device 400 according to some implementations. Partner device 400 includes a processing unit 402 coupled to a storage device 404 and one or more communication interfaces 406. In some implementations, partner device 400 may be mobile devices (e.g., cell phones, etc.) that both receives backups from other mobile devices and backs-up its own information to other partner devices. Partner device 400 may include one or more communication interfaces, either wired or wireless, through with it can communicate with mobile devices, other partner devices, networks, or a centralized server that manages backup information.

A backup assistant application may operate in processing unit 402 to facilitate backups from mobile devices to partner device 400. The backup assistant application may operate automatically, without user interaction, so that the partner device can back-up its information in the "background" (e.g., without affecting the primary operation of the partner device). That is, in some embodiments the primary function of a partner device is something other than as a backup device for the mobile device or a mere storage device. The backup assistant application may respond to a broadcast or query by a mobile device searching for a partner device. If partner device 400 recognizes the querying mobile station as a "trusted" device with which a backup relationship has been or may be established, then it affirmatively responds to the mobile station. Partner device 400 may also inform the mobile device of the amount of information it is willing to backup for the mobile device. Partner device 400 may have pre-allocated storage area in storage device 404 where it backs-up information for other devices. Alternatively, the backup assistant application may determine how much of storage device 404 capacity can be allocated to backups for other devices.

Once partner device 400 has received and stored backup information for a mobile device, it informs a centralized server of that it is holding backup information for a particular backup device. That is, the backup assistant application in partner device 400 knows which backup information belongs to which mobile device. It may also know the date of the backup information. Having such information, a centralized server can build a master list of where backup information is held for a particular mobile device.

Figure 5:
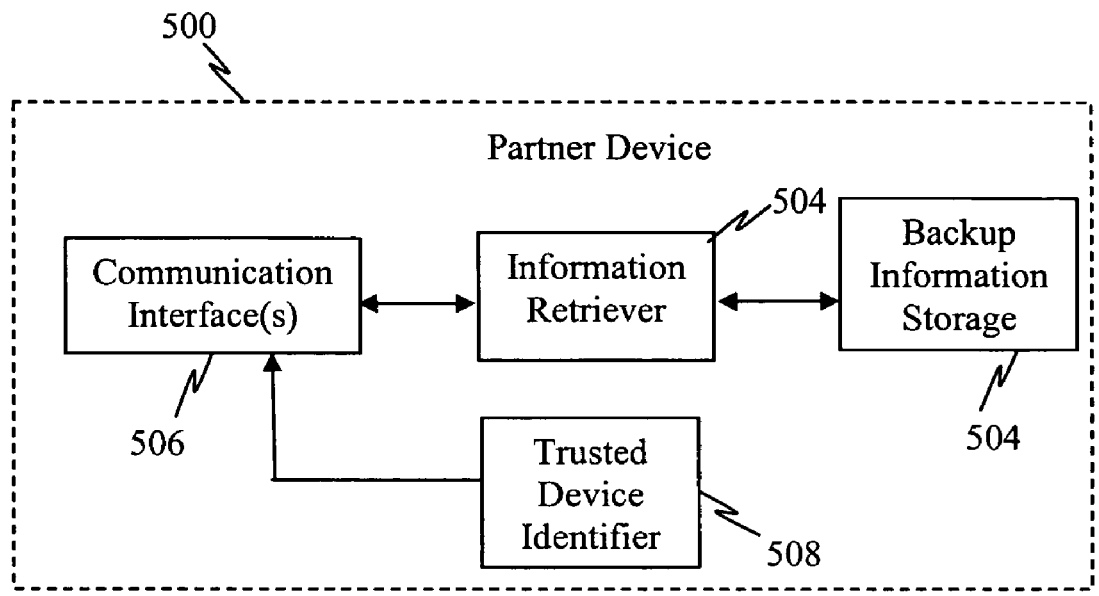
FIG. 5 is a block diagram illustrating components and functions of a partner device according to some implementations.

FIG. 5 is a block diagram illustrating components and functions of a partner device 500 according to some implementations. The partner device 500 includes a backup information storage 502 coupled to an information retriever which communicates through a communication interface 506. Information is received over the communication interface 506 by the information retriever 504 and stored in the backup information storage 504. A trusted device identifier 508 determines whether a mobile device is a trusted device.

One or more of the components and functions illustrated in FIGS. 4 and/or 5 may be rearranged and/or combined into a single component or embodied in several components without departing from the invention. Additional elements or components may also be added without departing from the invention.

Figure 6:
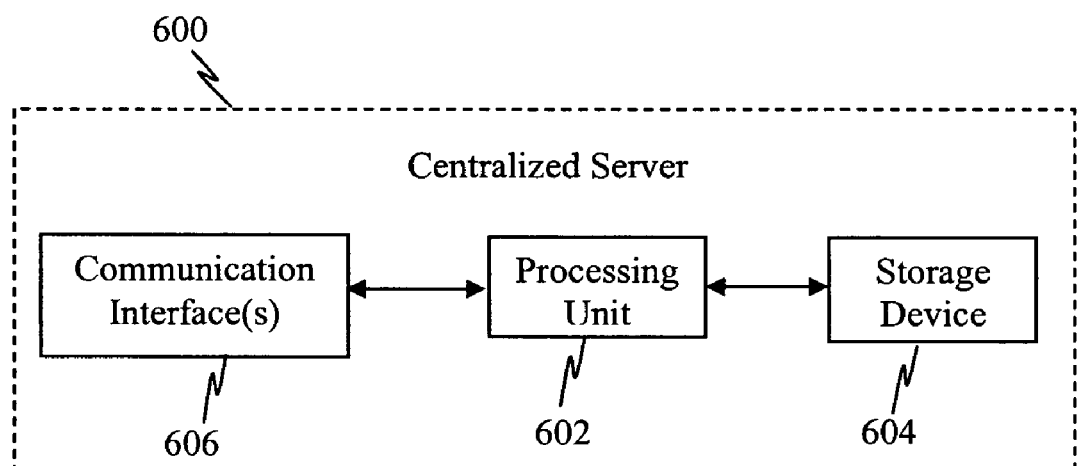
FIG. 6 is a block diagram illustrating a centralized server according to some implementations.

FIG. 6 is a block diagram illustrating a centralized server 600 according to some implementations. Centralized server 600 includes a processing unit 602 coupled to a storage device 604 and one or more communication interfaces 606. Communication interfaces 606 may be either wired or wireless enables centralized server 600 to communicate with partner devices or networks to manage backup information. The centralized server 600 may be configured to maintaining an index of the partner devices where backup information is stored. This facilitates the intelligent retrieval, consolidation, and reconstruction of the backed-up data while leaving the backed-up data stored in the partner devices.

Since the centralized server 600 has information of the date and type of information backed-up for a particular mobile device, it may direct partner devices to remove or delete older backup information for which more current backups exist. According to another implementation, the centralized server may permit multiple copies of the same backup information to be maintained by one or more partner devices. This way, the same information is backed-up in different partner devices, increasing the chances of future recovery if needed. Another feature provides for maintaining versions of the backup information having different backup dates so that information for a particular date can be reconstructed. In another implementation, the centralized server 600 may obtain and store some or all of the backed-up information for later retrieval.

One or more of the components and functions illustrated in FIG. 6 may be rearranged and/or combined into a single component or embodied in several components without departing from the invention. Additional elements or components may also be added without departing from the invention.

Figures 7, 8:
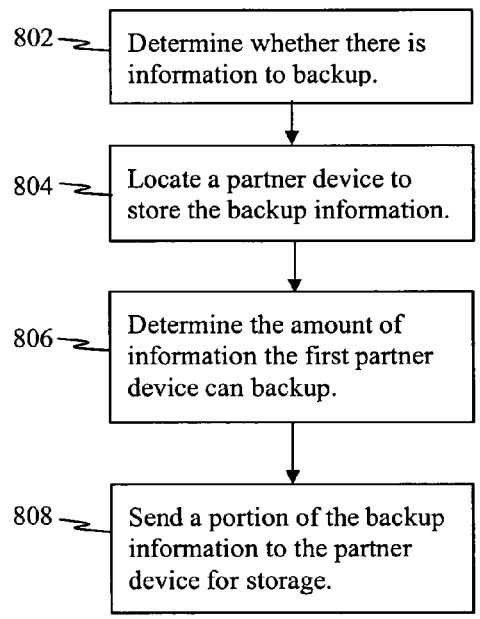
FIG. 7 illustrates an index that may be maintained by a centralized server to keep track of backup locations and dates for a mobile device.
FIG. 8 is a flow diagram illustrating a method operational on a mobile device to backup information on a partner device.

FIG. 7 illustrates an index that may be maintained by a centralized server to keep track of backup locations and dates for a mobile device. In this implementation, the centralized server may have index information about the fragments backed-up at various partner devices and the date of the backup. For example, Pictures 1-8 and 14-17 maybe be backed-up in Partner Devices A and B, respectively, and at different dates. Phone numbers may have been backed-up in Partner Devices D and E on different dates and text messages 34-35 is stored in Partner Device C. If a mobile device needs to reconstruct its content, the backups are retrieved via the centralized server. Where the same backup information is found in two or more partner devices, the user is offered the opportunity to choose between restoring with the most recent backup date or a previous backup, if so desired. By distributing backup information across multiple partner devices, the distributed backup system makes efficient use of surplus storage capacity on partner devices avoiding the transfer time and storage costs associated with storing all information on a single location.

In another aspect of the invention, the backup information stored in partner devices is periodically sent to the centralized server for storage. This way, the centralized server stores the backup information, freeing storage space from the partner devices.

FIG. 8 is a flow diagram illustrating a method operational on a mobile device to backup information on a partner device. The mobile device determines whether there is information to backup 802. This may be accomplished by keeping track of the new information in the mobile device since a previous backup. Alternatively, the mobile device may be configured to backup all information at certain time intervals (e.g., monthly, weekly etc.). If there is information to backup, the mobile device attempts to locate a partner device to store the backup information 804. This may be done by sending messages with the mobile device's identifier requesting partner devices in the vicinity to reply. Such messages may be broadcasted over a wireless communication interface or sent through a wired communication link. If a partner device is found, the mobile device determines the amount of information that the partner device can backup 806. In some implementations, the partner device may inform the mobile device how much information it is willing to backup for the mobile device. In other implementations, the mobile device may request such information from the partner device. The mobile device then sends the backup information to the partner device for storage 808. In some implementations, the mobile device sends a portion of the total information to be backed-up to the partner device. The remaining information is sent to other partner devices.

Figure 9:
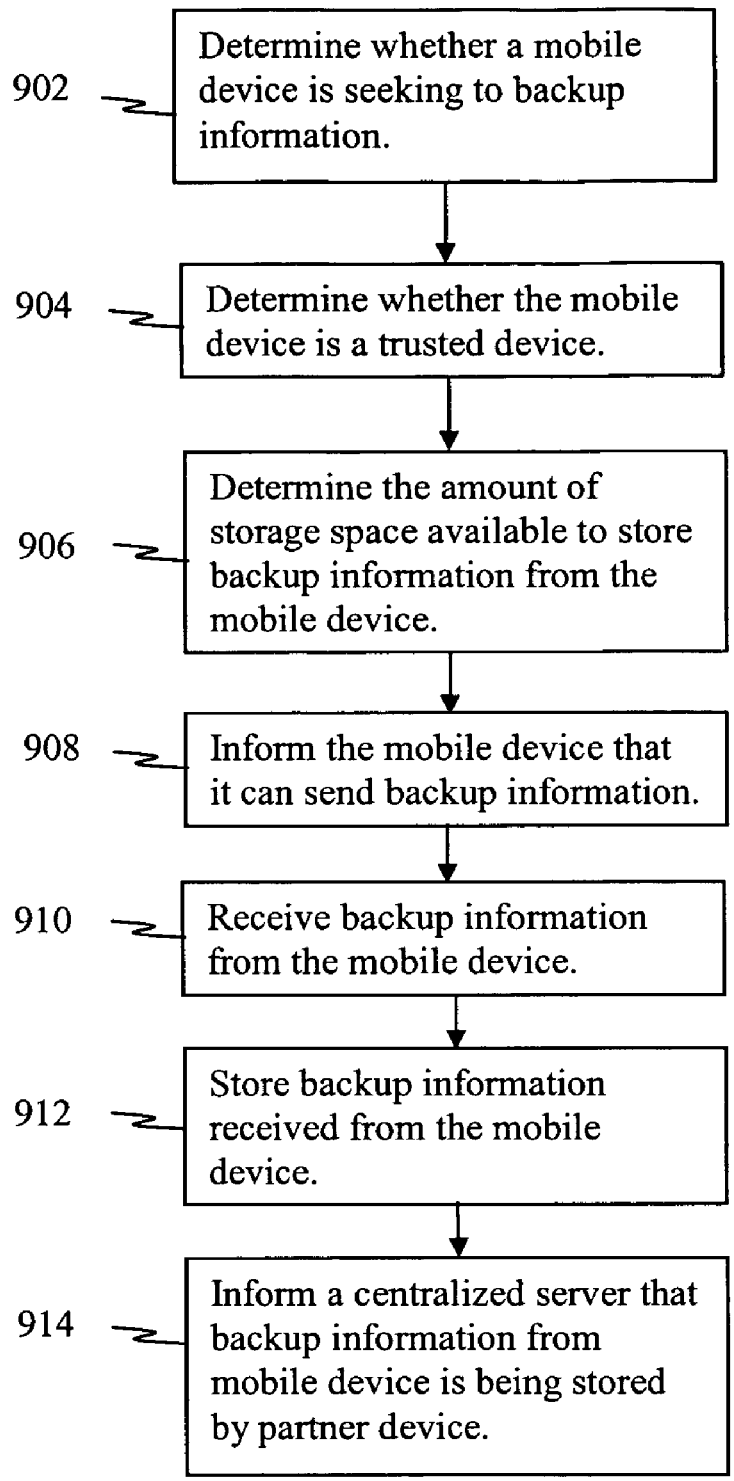
FIG. 9 is a flow diagram illustrating a method operational on a partner device to backup information received from a mobile device.

FIG. 9 is a flow diagram illustrating a method operational on a partner device to backup information received from a mobile device. The partner device determines whether a mobile device is seeking to backup information 902. Such determination may be based on an indication, such as a broadcast message, from a mobile device seeking a partner device. The partner device then determines whether the mobile device is a trusted device 904. That is, depending on the level of security sought by either the mobile device and/or partner device, a determination is made as to whether the mobile device should send backup information to a particular partner device or whether the partner device should receive backup information from a particular mobile device. In some instances, a predefined relationship may enable a mobile device to backup information to a particular a partner device. For instance, the partner device may be preconfigured with identifying information for the mobile device.

The partner device then determines the amount of storage space available to store backup information from the mobile device 906. This storage capacity may be configurable by a user or set, either beforehand or on-the-fly, by the backup assistant application operating on the partner device. The partner device then informs the mobile device that it can send backup information 908, receives the backup information from the mobile device 910, and stores it 912.

In some embodiments, the partner device informs a centralized server that backup information from mobile device is being stored by partner device 914. The partner device may provide specific identifying information (e.g., backup identifier, backup date, etc.) about the backup to the centralized server to facilitate reconstruction if needed.

Figure 10:
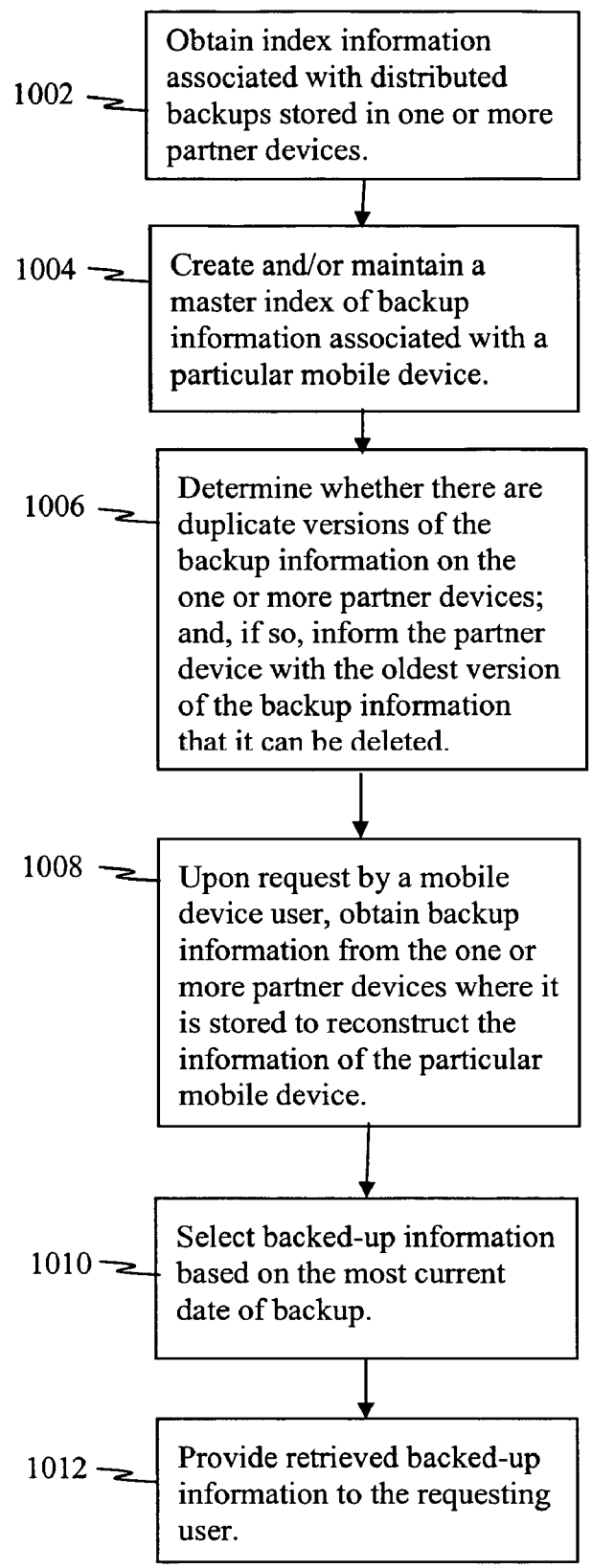
FIG. 10 is a flow diagram illustrating a method operational on a centralize server to consolidate backup information received from partner devices.

FIG. 10 is a flow diagram illustrating a method operational on a centralized server to consolidate backup information received from partner devices. The centralized server receives or obtains index information associated with distributed backups stored in one or more partner devices 1002. This may be as a result of the centralized server requesting, obtaining, or retrieving such index information from the partner devices or simply by the partner devices providing such information. In another implementation, the mobile device that backs-up its information onto partner devices may inform the centralized server, either directly or indirectly, of the location (e.g., partner devices) were its backups are stored). The mobile device may send such message to the centralized server periodically or after it has backed-up some information.

The centralized server then creates and/or maintains a master index of backup information associated with a particular mobile device 1004. As illustrated in FIG. 7, the centralized server may create list of partner devices storing backups for a particular mobile device. This list may be updated when a newer version of the same backup information is found by the centralized server. In some implementations, older versions of mobile device backups are replaced whenever newer versions become available. In such instance, the centralized server may inform the partner device that stores an older version of backup information that it can delete the older backup information. For example, the centralized server may determine whether there are duplicate versions of the backup information on the one or more partner devices, and, if so, inform the partner device with the oldest version of the backup information that it can be deleted 1006. According to another implementation, the centralized server may permit multiple copies of the same backup information or different versions of the backup information to be maintained by one or more partner devices. This increases the chances of future recovery of such information, since even if some partner devices are lost or unavailable, the backup information can be retrieved if needed. Having different generations (e.g., different backup dates) of the information permits reconstructing information for a particular date. In another implementation, the centralized server 600 may obtain and store some or all of the backed-up information for later retrieval.

The centralized server facilitates recovery of the distributed backup information. Upon request by a mobile device user, the centralized server obtains the backup information from the one or more partner devices where it is stored to reconstruct the information of a particular mobile device 1008. The retrieved backed-up information may be selected based on the most current date of backup 1010. The retrieved backed-up information is then provided to the requesting user 1012.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A mobile device comprising:
a storage device to store mobile device content; and
a processing unit configured to
locate a first partner device to receive the mobile device content,
determine a level of trust with the first partner device,
determine a level of secure relationship depending on the determined level of trust,
the level of secure relationship transferable to other partner devices,
obtain a portion of the mobile device content from the storage device, and
send the portion of the mobile device content to the first partner device for backup.

2. The mobile device of 1 further comprising:
one or more communication interfaces coupled to the processing unit, wherein the processing unit is configured to search for the first partner device through the one or more communication interfaces.

3. The mobile device of 2 wherein the one or more interfaces provide a wireless communication link to the first partner device.

4. The mobile device of 2 wherein the one or more interfaces provide a wired communication link to the first partner device.

5. The mobile device of 1 wherein the processing unit is further configured to determine the portions of the mobile device content that should be backed-up.

6. The mobile device of 1 wherein the processing unit is further configured to determine the amount of information the first partner device can backup.

7. The mobile device of 1 wherein the processing unit is further configured to restore the backup information from a plurality of partner devices to the storage device.

8. The mobile device of 1 wherein the processing unit is further configured to
locate a second partner device to receive the mobile device content,
obtain another portion of the mobile device content from the storage device, and
send the another portion of the mobile device content to the second partner device for backup.

9. The mobile device of 1 wherein the processing unit is further configured to
determine whether the first partner device is trustworthy to receive the mobile device content.

10. A mobile device comprising:
means for storing information;
means for locating a first partner device to backup the information;
means for determining a trust level with the partner device;
means for determining a secure relationship with the partner device, the secure relationship transferable to other partner devices;
means for retrieving a portion of the information; and
means for communicating a portion of the information to the partner device.

11. The mobile device of 10 further comprising:
means for determining the portions of the mobile device content that should be backed-up.

12. The mobile device of 10 further comprising:
means for restoring the backup information from a plurality of partner devices.

13. An apparatus comprising:
a storage device to backup information from a mobile device; and
a processing unit configured to
determine a level of trust with a first mobile device,
determine a level of secure relationship with the mobile device depending on the determined level of trust, the level of secure relationship transferable to other mobile devices,
receive information to backup from the mobile device, and
store the received information in the storage device.

14. The apparatus of 13 wherein the information received from the mobile device is a portion of the information available for backing-up at the mobile device.

15. The apparatus of 13 wherein the information is wirelessly received from the mobile device.

16. The apparatus of 13 wherein the processing unit is further configured to
determine the amount of information the storage device can receive from the mobile device for backup.

17. The apparatus of 13 wherein the processing unit is further configured to
send the backup information to a centralized storage server.

18. The apparatus of 13 wherein the processing unit is further configured to
notify a centralized server of the portions of information from the mobile device that are backed-up in the storage device.

19. The apparatus of 13 wherein the processing unit is further configured to
remove the received information from the storage device upon receipt of a message from a centralized server.

20. An apparatus comprising:
means for storing backup information from a mobile device;
means for determining whether a mobile device is a trusted device;
means for determining a secure relationship with the mobile device dependent upon whether the mobile device is a trust device, the secure relationship transferable to other trusted devices;
means for receiving information to backup from the mobile device; and
means for storing the received information in the storage device.

* * * * *